United States Patent Office 3,365,437
Patented Jan. 23, 1968

3,365,437
ANTISTATIC POLYETHYLENE COMPOSITIONS
Joseph V. Marra, Sherwood Park, and Harold M. Spurlin, Cooper Farm, Del., assignors to Hercules Incorporated, a corporation of Delaware
No Drawing. Filed July 28, 1965, Ser. No. 475,578
9 Claims. (Cl. 260—94.9)

The present invention relates to polyolefins having good antistatic properties.

The problem of static build-up has long been one of the more annoying problems associated with the plastics art. Electrification, producing static, results from the segregation of positive and negative charges which occurs when two surfaces are parted after close initial contact. During processing this can occur on the removal of a molding from a die, from alternate contacting and separating of a film with rollers in a film processing machine, or from handling of the object in use. Among the many objectionable manifestations of this problem is the tendency of synthetic plastic materials to attract dust, lint, cigarette smoke, and similar light-weight foreign matter usually found in most environments.

The static build-up problem is particularly annoying with the olefin polymers such as polyethylene and polypropylene. These materials, whose molecular structure resembles that of a very large hydrocarbon molecule, are extremely inert chemically due to the absence of functional groups in the molecule. Lacking polar conductive groups in their molecules, these materials have virtually no way of dissipating the static charge which invariably builds up during processing and handling. Thus the static problem has been found to be even more serious with these materials than with other types of synthetic plastics.

Several approaches have been taken to the problem of providing antistatic protection for articles fabricated from polyolefins. In one such approach an antistatic agent is applied to the surface of an already molded or shaped article. Examples of this method of operation can be found in, e.g., U.S. 2,937,066 to Walles and U.S. 2,678,285 to Browning. Certain quaternary ammonium compounds have been found to be very effective antistatic agents when applied in this manner to the surface of polyolefin articles.

Though the surface coating approach can be used to advantage in many cases, it is subject to several very practical objections. One such objection is that, the application of the coating being a separate handling step after fabrication, the method becomes economically less appealing. Another, more serious, objection is that the surface of the object is usually subjected to considerable wear and tear in use and the coating will eventually wear off, leaving the item lacking in antistatic protection.

Another approach to the problem has been to incorporate the antistatic agent into the polymer prior to its fabrication into a shaped structure. This method is much more attractive economically than the surface coating technique and for this reason is preferable to surface coating. In British Patent 906,174, it is shown that N,N-bis(hydroxyethyl) fatty acid amides are effective antistatic agents for polyethylene when used in this manner.

It has now been found that the antistatic performance of the aforesaid N,N-bis(hydroxyethyl) fatty acid amides, and other hydroxyalkyl fatty acid amides, is substantially improved when they are employed in combination with an ionic salt of a monovalent metal. Accordingly, the instant invention provides antistatic polyolefin compositions comprising a major portion of a poly($\alpha$-olefin) having admixed therewith a N,N-bis(hydroxyalkyl) fatty acid amide and an ionic salt of a monovalent metal. More specifically, the invention comprises poly($\alpha$-olefin) compositions containing a total of 0.1 to 1.0%, based on the weight of the polymer, of a N,N-bis(hydroxyalkyl) amide of a fatty acid having 8 to 18 carbon atoms and the ionic salt. The ratio of the amide to the salt in the composition can vary from about 1:1 to 10:1.

The hydroxyalkyl fatty acid amides employed in the compositions of the invention are relatively high molecular weight compounds having the general formula

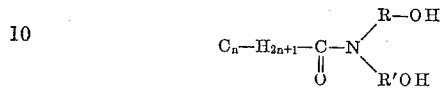

where $n$ is 7 to 17 and R is a 1 to 4 carbon alkyl radical. The carbon chain ($C_nH_{2n+1}$) of the amide can be normal or branched. Examples of such amides include N,N-bis(hydroxyethyl)caprylamide, N,N - bis(hydroxypropyl)caprylamide, N,N-bis(hydroxyethyl)pelargonamide, N,N-bis(hydroxyethyl)capramide, N,N - bis(hydroxymethyl)lauramide, N,N-bis(hydroxyethyl)lauramide, N,N-bis(hydroxyethyl)myristamide, N,N - bis(hydroxyethyl)palmitamide, N,N - bis(hydroxyethyl)stearamide, N,N-bis(hydroxybutyl)stearamide, N,N-bis(hydroxyethyl)6-methylenanthamide, N,N-bis(hydroxyethyl)-5-ethylcaprylamide, N,N-bis(hydroxybutyl)-4-methyllauramide, etc.

The metal salt used in the compositions of this invention is preferably a salt of an alkali metal. Among the said alkali metal salts, the preferred salts are those of sodium, lithium, and potassium.

It is found that, while all salts of monovalent metals exhibit some efficacy in the process of this invention, the preferred salts are the halides, thiocyanates, nitrates, nitrites, phosphates, organo-sulfonates, and carboxylates having up to about 18 carbon atoms. Specific examples of useful salts include sodium chloride, lithium chloride, potassium bromide, potassium thiocyanate, sodium thiocyanate, sodium nitrate, potassium nitrite, lithium nitrite, lithium nitrate, sodium dihydrogen phosphate, potassium phosphate, sodium dialkyl phosphate, dilithium phosphate, sodium toluene sulfonate, sodium methane sulfonate, potassium methane sulfonate, sodium acetate, lithium isobutyrate, potassium palmitate, lithium myristate, etc.

The reason for the improved antistatic characteristics of these compositions is not understood for certain. However, the following theory has been advanced in explanation, though it is not intended that the invention should be bound or limited by any particular theory.

It is postulated that the active antistatic species in the compositions is the ionic salt, which by virtue of its relatively great polarity can cause the polymer surface to become sufficiently conductive to dissipate a static charge. However, these salts are of relatively low organic solubility and thus, when incorporated into a polymer matrix, they ordinarily exhibit little tendency to diffuse to the surface where they are needed. The hydroxyalkyl amides, on the other hand, are somewhat soluble in organic media, specifically in the amorphous phases of the polyolefin matrix. The amides which are specified as being useful in this invention are such that their solubility in the amorphous phase makes them sufficiently compatible with the polymer to prevent their complete exudation therefrom but permits sufficient exudation to form a monomolecular layer thereof on the polymer surface. In addition, these hydroxyalkyl amides are potentially capable of chelating or otherwise complexing the ionic alkali metal salts. By means of this complexing, these salts are transformed into an organosoluble form which is capable of dissolving in the amorphous portion of the polyolefin matrix, and is thus able to diffuse to the surface whereby a portion of the salt becomes included in the monomolecular layer which is formed on the surface by the hydroxyalkyl amide.

The electrical conductivity which is required to dissipate the static charge also requires that the ions of the salt exhibit a relatively high degree of mobility in the monomolecular layer. To this end it is necessary to use a hydroxyalkyl amide which has very little crystallinity, a condition which is satisfied by using amides of the molecular size and structure specified.

The specified additives are used in the ratio of about 1 to 10 parts by weight of amide to one part of the salt. They can be added to the polymer prior to the molding or other shaping thereof. The polymer at this point can be in any form—usually it will be in the form of molding powder or in flake form as it is recovered from the polymerization operation.

The antistatic composition can be incorporated into the polymer in any convenient manner which will effect a uniform blending therewith. For example, the additives may be incorporated by mixing on a three-roll mill, Banbury mixer, or the like. They may also be incorporated by plasticizing in a compounding extruder. A particularly good method is to contact the polymer with a solution or disperson of the additives and, after thorough agitation to insure uniform contacting with the solution, removing the solvent. This latter technique provides a uniform distribution of the additives throughout the polymer mass and when the polymer is subsequently melted for shaping, a relatively homogeneous distribution of the composition through the polymer results with a minimum of mixing.

The propensity of a plastic surface for building up a static electricity charge is indicated by its surface resistivity which is a measure of the electrical resistivity of the surface per unit area, expressed as ohms/square. Higher values of resistivity indicate greater static build-up. Resistivity is measured by the method of ASTM Standard Test Procedure D-257-61.

In the examples which follow, the antistatic qualities of the various samples are determined by measuring their surface resistivity and also by comparing their dust retention characteristics against a control specimen, coated with a 1% alcohol solution of dimethyl distearyl ammonium chloride. This compound has been found to be an excellent antistatic when applied to plastic surfaces. The dust retention test is referred to hereafter as the "ammonium compound (A.C.) rating test."

The A.C. rating test is carried out on 5 specimens prepared with each composition. The specimens are first conditioned at 15% R.H. and 80° F. for two days. After two days, each specimen is rubbed 10 times on each surface with a fresh paper towel to generate a static charge, placed in the test apparatus, and conditioned for another day at 15% R.H. and 80° F. At the end of the conditioning period, the specimens are sealed within the test apparatus which comprises an airtight cabinet equipped with an external burning chamber and a blower for circulating air between the burning chamber and the cabinet. Five 9.0 cm. filter paper discs are then saturated with toluene, excess toluene is allowed to drain off, and the paper is ignited and placed in the burning chamber. After the flame has subsided, the blower is actuated and smoke-containing air is circulated for 15 minutes. The specimens are rated by selecting the cleanest ammonium compound treated specimen and the dirtiest untreated specimen, and placing these against a white background. These are assigned ratings of 100 and 20, respectively. Three additional specimens, either treated or untreated, having three intermediate levels of smoke accumulation, are selected and placed between the 20 and 100% specimens. These are assigned ratings of 40, 60, and 80, respectively. Remaining specimens are compared individually with the five bench mark specimens and given ratings of 20, 40, 60, 80, or 100. The result reported is the average of the five specimens prepared with each composition. Obviously, higher ratings indicate better smoke resistance and, accordingly, better antistatic protection. A rating of 60 or higher is considered satisfactory.

The following examples, in which parts and percentages are by weight unless otherwise indicated, illustrate the improved antistatic properties of the compositions of the invention.

*Example 1*

High density polyethylene prepared by means of a reduced titanium chloride—aluminum alkyl catalyst was mixed with 0.1% of a 5 to 1 mixture of N,N-bis(hydroxyethyl)lauramide and sodium acetate.

Concurrently, other portions of the same polymer batch were prepared containing, respectively, no antistatic additive, 0.1% N,N-bis(hydroxyethyl)lauramide alone, and 0.1% sodium acetate alone. The antistatic additives were added to the polymer as dry powder and blended thoroughly. The various mixes were melted in a compounding extruder and blow-molded into bottles. These bottles were subjected to the A.C. rating test. A.C. ratings were as follows:

(a) Unmodified polyethylene _____ 20
(b) Polyethylene+N,N-bis(hydroxyethyl)
    lauramide _____ 48
(c) Polyethylene+sodium acetate _____ 20
(d) Polyethylene+N,N-bis(hydroxyethyllauramide)
    +sodium acetate _____ 84

The improved antistatic characteristics of the polyethylene modified according to the instant invention are clearly evidenced by these results.

*Examples 2–8*

Further portions of the polyethylene described in Example 1 were formulated with other metal salts and other amide/salt ratios. These were blow-molded into bottles and subjected to the A.C. rating test. The data for these examples are tabulated in Table 1.

TABLE 1

| Ex. No. | Additive Composition | Additive Conc. | Amide/Salt Ratio | A.C. Rating |
|---|---|---|---|---|
| 2 | DEL/sodium butyrate | 0.1 | 5/1 | 60 |
| 3 | DEL/sodium caprylate | 0.1 | 5/1 | 63 |
| 4 | DEL/sodium laurate | 0.1 | 5/1 | 68 |
| 5 | DEL/sodium stearate | 0.1 | 5/1 | 76 |
| 6 | DEL/sodium acetate | 0.1 | 1/1 | 80 |
| 7 | DEL/lithium acetate | 0.1 | 5/1 | 69 |
| 8 | DEL/calcium acetate | 0.1 | 2/1 | 72 |

DEL=N,N-bis (hydroxyethyl) lauramide.

*Examples 9–16*

Portions of the polymer prepared in Example 1 were formulated with the antistatic agents of the invention and compression molded to form plaques. The molding was effected at about 2000 p.s.i. for 8 minutes at 347° F. The A.C. ratings for these plaques were determined in the usual manner. The surface resistivity of some of the plaques was determined according to ASTM procedure D-257-61 after application of 500 volts for one minute at 50% R.H. Control tests were also run wherein specimens not treated according to the invention were tested. Results of these tests are tabulated in Tables 2 and 3.

TABLE 2

| Ex. No. | Additive Composition | Conc. | Amide/Salt Ratio | Surface Resistivity |
|---|---|---|---|---|
| 9 | DEL/sodium acetate | 0.6 | 5/1 | $5 \times 10^{11}$ |
| 10 | DEL | 1.0 | | $3.6 \times 10^{12}$ |
| 11 | | | | $1 \times 10^{14}$ |
| 12 | DEL/lithium acetate | 0.6 | 5/1 | $1.8 \times 10^{15}$ |
| 13 | DEL/calcium acetate | 0.7 | 5/2 | $1.2 \times 10^{11}$ |

TABLE 3

| Ex. No. | Additive Composition | Conc. | Amide/Salt Ratio | A.C. Rating |
|---|---|---|---|---|
| 14 | DES/sodium laurate | 0.5 | 5/1 | 80 |
| 15 | DEL | 0.5 | --- | 40 |
| 16 | DEC/sodium laurate | 0.5 | 5/1 | 90 |

DES=N,N-bis(hydroxyethyl)stearamide.
DEC=N,N-bis(hydroxyethyl)caprylamide.

*Examples 16–27*

Stereoregular polypropylene and a copolymer of propylene and ethylene (57% propylene) were blended with diethanol-lauramide and various inorganic salts, molded to form plaques and subjected to the A.C. rating test previously described. The results are tabulated in Table 4.

TABLE 4

| Ex. No. | Polymer | Ionic salt | Conc. | Amide/Salt Ratio | A.C. Rating |
|---|---|---|---|---|---|
| 16 | Polypropylene | None | --- | --- | 20 |
| 17 | do | KSCN | 0.1% | 5/1 | 70 |
| 18 | do | KSCN | 0.1% | 3/2 | 75 |
| 19 | do | KSCN | 0.2% | 5/1 | 90 |
| 20 | do | NaNO$_2$ | 0.1% | 4/1 | 80 |
| 21 | do | Potassium toulene sulfonate | 0.2% | 2/1 | 85 |
| 22 | do | do | 0.1% | 2/1 | 80 |
| 23 | Copolymer | Sodium methane sulfonate | 0.1% | 3/1 | 85 |
| 24 | do | do | 0.1% | 5/1 | 75 |
| 25 | do | NaNO$_3$ | 0.1% | 3/1 | 75 |
| 26 | do | Na dibutyl phosphate | 0.1% | 4/1 | 80 |
| 27 | do | KBr | 0.1% | 3/1 | 85 |

The invention has been described with reference to polymers and copolymers of ethylene and propylene. It is equally applicable to polymers of other α-olefins, such as for instance butene-1, 3-methyl pentene-1, styrene and the like.

Compositions which have been treated to render them antistatic according to this invention are useful in all applications where these polymers normally are used and where antistatic protection is desirable. Examples of such uses include molded objects, films and fibers.

What we claim and desire to protect by Letters Patent is:

1. A composition comprising a poly-α-olefin and about 0.1 to 1% by weight of the polymer of a mixture of an N,N-bis(hydroxyalkyl)amide of a fatty acid having 8–18 carbon atoms and an alkali metal salt, said amide and said salt being present in a ratio of about 1:1 to 10:1.

2. The composition of claim 1 where the salt is a salt of lithium, potassium, or sodium.

3. The composition of claim 2 where the salt is a halide, a thiocyanate, a nitrate, a nitrite, a phosphate, a toluene sulfonate, a methane sulfonate or a carboxylate, having up to about 18 carbon atoms.

4. The composition of claim 3 where the fatty acid amide is N,N-bis(hydroxyethyl)lauramide, N,N-bis(hydroxyethyl)stearamide, or N,N-bis(hydroxyethyl)caprylamide.

5. The composition of claim 4 where the poly-α-olefin is polyethylene, polypropylene or a copolymer of ethylene and propylene.

6. A composition comprising polyethylene and about 0.1 to 1% by weight, based on the weight of the polyethylene, of a mixture of N,N-bis(hydroxyethyl)lauramide and sodium acetate, the ratio of amide to salt being about 1:1 to 5:1.

7. A composition comprising polyethylene and about 0.1 to 1% by weight, based on the weight of the polyethylene, of a mixture of N,N-bis(hydroxyethyl)lauramide and lithium chloride, the ratio of amide to salt being about 1:1 to 5:1.

8. A composition comprising stereoregular polypropylene and about 0.1 to 1% by weight, based on the weight of the polyethylene, of a mixture of N,N-bis(hydroxyethyl)lauramide and sodium acetate, the ratio of amide to salt being about 1:1 to 5:1.

9. A composition comprising polypropylene and about 0.1 to 1% by weight, based on the weight of the polypropylene, of a mixture of N,N-bis(hydroxyethyl)lauramide and lithium chloride, the ratio of amide to salt being about 1:1 to 5:1.

No references cited.

JOSEPH L. SCHOFER, *Primary Examiner.*

UNITED STATES PATENT OFFICE
CERTIFICATE OF CORRECTION

Patent No. 3,365,437  January 23, 1968

Joseph V. Marra et al.

It is hereby certified that error appears in the above numbered patent requiring correction and that the said Letters Patent should read as corrected below.

Column 3, line 20, for "plasticizing" read -- plasticating --; column 4, TABLE 2, fifth column, lines 3, 4 and 5, for $$\begin{array}{ccc} 1 \times 10^1 & & 1 \times 10^{16} \\ 1.8 \times 10^{16} & \text{read} & 1.8 \times 10^{11} \\ 1.2 \times 10^{11} & & 1.2 \times 10^{12} \end{array}$$

Signed and sealed this 8th day of April 1969.

(SEAL)
Attest:

Edward M. Fletcher, Jr.
Attesting Officer

EDWARD J. BRENNER
Commissioner of Patents